No. 818,921. PATENTED APR. 24, 1906.
H. STEINERT & M. SCHIMELPFENNIG.
LOCK NUT.
APPLICATION FILED JUNE 21, 1905.

WITNESSES
Henry Steinert
and
Michael Schimelpfennig
INVENTORS

BY
ATTY.

UNITED STATES PATENT OFFICE.

HENRY STEINERT AND MICHAEL SCHIMELPFENNIG, OF TAMAQUA, PENNSYLVANIA.

LOCK-NUT.

No. 818,921. Specification of Letters Patent. Patented April 24, 1906.

Application filed June 21, 1905. Serial No. 266,249.

*To all whom it may concern:*

Be it known that we, HENRY STEINERT and MICHAEL SCHIMELPFENNIG, citizens of the United States, residing at Tamaqua, county of Schuylkill, and State of Pennsylvania, have invented a certain new and useful Improvement in Lock-Nuts, of which the following is a specification.

Our invention relates to a new and useful improvement in lock-nuts, and has for its object to provide a device by which the nut may be locked upon the bolt after the same is tightened, so as to prevent any retrograde movement of the nut upon the bolt by vibration, pressure, or other means.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1:
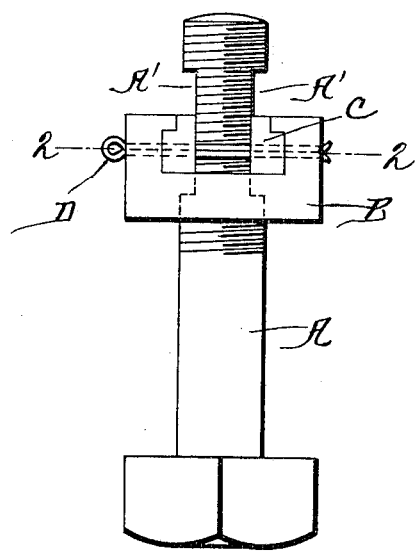
Figure 2:
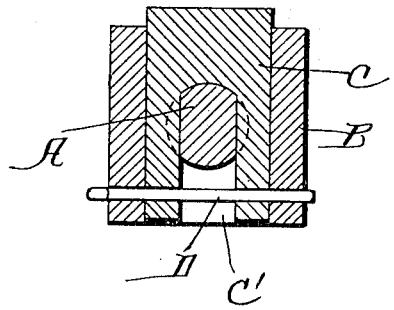
Figure 3:
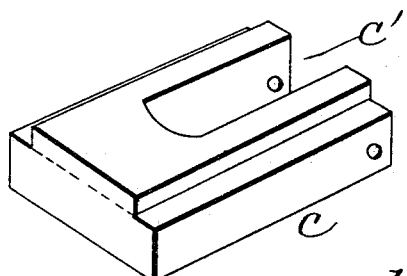

Figure 1 is a side elevation of a bolt and nut with our improved locking device; Fig. 2, a cross-section taken on the line 2 2 of Fig. 1; Fig. 3, a perspective view of the key.

A represents the bolt, the threaded portion of which is cut away for a distance upon each side, so that flattened surfaces A' will be formed upon each side of the bolt. B is the nut adapted to be threaded upon the bolt in the usual way with a wrench. In the upper or lower surface of this nut is formed an undercut guideway adapted to receive a key C after the nut has been tightened in place. The sides of said key are shouldered, so as to fit the undercut guideway, and said key is also slotted in from one end, as represented at C', so that this key is in the form of a fork and adapted to straddle the cut-away portion of the bolt, so that the prongs of the key will pass upon each side and coming in close contact with the flattened sides A' will prevent the nut turning upon the bolt. If it is found necessary, the key C can be secured against displacement by forming lateral openings through one end of the nut and also through the prongs of the key and passing a cotter-pin D or the like through said openings, as shown in Fig. 2. Thus it will be seen that we have provided a nut-lock which can be easily and quickly applied or removed and will absolutely prevent any retrograde movement of the nut upon the bolt. Of course, if desired, only one side of the bolt need be flattened, or there could be more than two flattened surfaces upon the bolt to provide for a more delicate adjustment of the nut; but for all ordinary purposes two flattened surfaces, one upon each side of the bolt, is all that is necessary, for then it is only necessary to turn the nut around half-way to again secure the key in place.

Of course we do not wish to be limited to the exact construction here shown, as slight modifications could be made without departing from the spirit of our invention.

Having thus fully described our invention, what we claim as new and useful is—

In combination with a threaded bolt having opposite sides reduced intermediate the ends of its threaded portion, a nut adapted to be threaded on the bolt, a recess extending across one of the faces of the nut, the walls of the recess being stepped, a fork adapted to fit within the recess, the walls of the fork being stepped to conform to the steps of the walls of the recess, said fork embracing the reduced portion of the bolt, and means passing through the nut and the fork to hold the fork against displacement from the recess of the nut.

In testimony whereof we have hereunto affixed our signatures in the presence of two subscribing witnesses.

HENRY STEINERT.
MICHAEL SCHIMELPFENNIG.

Witnesses:
 WALTER S. SEIDERS,
 FRANCIS O. LAMBERT.